(12) United States Patent
Shigeta

(10) Patent No.: US 12,139,116 B2
(45) Date of Patent: Nov. 12, 2024

(54) DISK BRAKE

(71) Applicant: Hitachi Astemo, Ltd., Ibaraki (JP)

(72) Inventor: Hiroshi Shigeta, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 332 days.

(21) Appl. No.: 17/638,380

(22) PCT Filed: Jul. 3, 2020

(86) PCT No.: PCT/JP2020/026242
§ 371 (c)(1),
(2) Date: Feb. 25, 2022

(87) PCT Pub. No.: WO2021/039124
PCT Pub. Date: Mar. 4, 2021

(65) Prior Publication Data
US 2022/0281430 A1    Sep. 8, 2022

(30) Foreign Application Priority Data
Aug. 28, 2019  (JP) .................. 2019-155689

(51) Int. Cl.
*F16D 65/18*  (2006.01)
*B60T 1/06*  (2006.01)
(Continued)

(52) U.S. Cl.
CPC ............ *B60T 13/746* (2013.01); *B60T 1/065* (2013.01); *F16D 55/226* (2013.01); *F16D 65/18* (2013.01);
(Continued)

(58) Field of Classification Search
CPC ...... B60T 13/746; B60T 1/065; F16D 55/226; F16D 65/18; F16D 2121/24; F16D 2125/48; F16D 2125/50
(Continued)

(56) References Cited

U.S. PATENT DOCUMENTS

| | | | |
|---|---|---|---|
| 2017/0343065 A1* | 11/2017 | Okada | F16D 65/18 |
| 2022/0281430 A1* | 9/2022 | Shigeta | F16D 65/183 |
| 2023/0091307 A1* | 3/2023 | Nagata | B60T 13/746 188/72.1 |

FOREIGN PATENT DOCUMENTS

JP    2016-125544    7/2016

OTHER PUBLICATIONS

International Search Report issued Aug. 25, 2020 in International (PCT) Application No. PCT/JP2020/026242, with English-language translation.
(Continued)

*Primary Examiner* — Christopher P Schwartz
(74) *Attorney, Agent, or Firm* — Wenderoth, Lind & Ponack, L.L.P.

(57) ABSTRACT

A disk brake that includes, between an internal gear (69) and a first housing portion (19) of a housing (18), each of protrusion portions (105) provided on the internal gear side and engagement recessed portions (44) provided on the first housing side that are engaged with each other to restrict a relative rotation. Each of these protrusion portions on the internal gear side and engagement recessed portions on the first housing portion side are disposed along a direction perpendicular to a straight line connecting a radial center of a second speed reduction gear (67) and a radial center of a first speed reduction gear (54). Due to this configuration, the disk brake can improve the precision of the position of the (Continued)

internal gear of the planetary gear speed reduction mechanism (27) while reducing the cost.

4 Claims, 4 Drawing Sheets

(51) Int. Cl.
*B60T 13/74* (2006.01)
*F16D 55/226* (2006.01)
*F16D 121/24* (2012.01)
*F16D 125/48* (2012.01)
*F16D 125/50* (2012.01)

(52) U.S. Cl.
CPC ...... *F16D 2121/24* (2013.01); *F16D 2125/48* (2013.01); *F16D 2125/50* (2013.01)

(58) Field of Classification Search
USPC .............................. 188/72.1, 72.3, 156–164
See application file for complete search history.

(56) References Cited

OTHER PUBLICATIONS

Written Opinion of the International Searching Authority issued Aug. 25, 2020 in International (PCT) Application No. PCT/JP2020/026242, with English-language translation.

* cited by examiner

DISK BRAKE

TECHNICAL FIELD

The present invention relates to a disk brake used to brake a vehicle.

BACKGROUND ART

As a conventional disk brake, PTL 1 discloses a speed reduction mechanism for actuating a parking disk brake used at the time of parking brake or the like. More specifically, a planetary gear speed reduction mechanism is employed as the speed reduction mechanism in the invention disclosed in this PTL 1. This planetary gear speed reduction mechanism includes a sun gear (a central gear) of a second speed reduction gear, a plurality of planetary gears (planet gears), an internal gear (an annulus gear), and a carrier. The plurality of planetary gears is meshed with this sun gear, and is disposed at intervals along the outer peripheral surface of the sun gear. The internal gear is meshed with each of these planetary gears, and is relatively non-rotatably supported on a housing. A pin member rotatably supporting each of the planetary gears is fixedly press-fitted in the carrier. Further, four protrusion portions are provided in a protruding manner on the outer peripheral surface of the internal gear at circumferential intervals. The internal gear is relatively non-rotatably supported on the housing by these protrusion portions being engaged with engagement grooves provided on the housing, respectively. Each of these protrusion portions and engagement grooves functions as a portion that prohibits a rotation of the internal gear relative to the housing.

CITATION LIST

Patent Literature

PTL 1: Japanese Patent Application Public Disclosure No. 2016-125544

SUMMARY OF INVENTION

Technical Problem

Then, in the planetary gear speed reduction mechanism discussed in PTL 1, four rotation prohibition portions (the protrusion portions and the engagement grooves) are formed at circumferential intervals between the internal gear and the housing, and a fit for restricting the position of the internal gear should be taken into consideration when each of these rotation prohibition portions is formed due to a lack of regularity among the respective positions of the rotation prohibition portions along the circumferential direction. This is because the contact portions of the rotation prohibition portions formed at the four positions are changed according to a variation in the dimensions of the rotation prohibition portions when the internal gear receives a rotational torque, and therefore a variation easily occurs in the position of the internal gear. Therefore, a dimensional tolerance regarding the fit should be reduced with respect to the rotation prohibition portions at the four positions to reduce the variation in the position of the internal gear, i.e., improve the precision of the position of the internal gear, but this causes a cost increase. In sum, the rotation prohibition portions at the four positions that are provided between the internal gear and the housing are located irregularly and randomly along the circumferential direction in the planetary gear speed reduction mechanism discussed in PTL 1, and therefore a fit dimensional tolerance along the radial direction and a fit dimensional tolerance along the circumferential direction should be reduced with respect to the rotation prohibition portions at the four positions to improve the precision of the position of the internal gear, and this causes a cost increase. The variation in the position of the internal gear is expected to affect the strength of gears associated therewith, actuation noise, a backlash, and the like.

Under these circumstances, an object of the present invention is to provide a disk brake that improves the precision of a position of an internal gear of a planetary gear speed reduction mechanism while reducing the cost.

Solution to Problem

As a method for achieving the above-described object, one aspect of the present invention includes a piston configured to press one of a pair of pads against a rotor with the pair of pads disposed on both axial sides of the rotor while sandwiching this rotor, a caliper main body including a cylinder portion in which this piston is movably contained and a piston thrust mechanism configured to thrust this piston is also contained, a motor mounted on this caliper main body, a speed reduction mechanism configured to power up a rotational force from this motor and transmit it to the piston thrust mechanism, and a support member on which this speed reduction mechanism is supported. The speed reduction mechanism includes a planetary gear speed reduction mechanism including an internal gear relatively non-rotatably supported on the support member, a first gear having a rotational axis near a radial center of the internal gear, and a second gear located adjacent to this first gear and configured to transmit the rotation from the motor to the first gear. A rotation restriction portion configured to restrict a relative rotation is provided between the internal gear and the support member. This rotation restriction portion is disposed along a direction perpendicular to a straight line connecting a radial center of the first gear and a radial center of the second gear.

Advantageous Effects of Invention

The disk brake according to the one aspect of the present invention can improve the precision of the position of the internal gear of the planetary gear speed reduction mechanism while reducing the cost.

DESCRIPTION OF EMBODIMENTS

In the following description, an embodiment of the present invention will be described in detail with reference to FIGS. 1 to 4. In the following description, the present embodiment will be described, referring to the internal side of the vehicle (an inner side) as one end side (a cover member 22 side), and the external side of the vehicle (an outer side) as the other end side (a disk rotor D side) as necessary. In other words, the present embodiment will be described, referring to the right side and the left side in FIGS. 1 and 2 as one end side and the other end side, respectively, as necessary.

Figure 1:
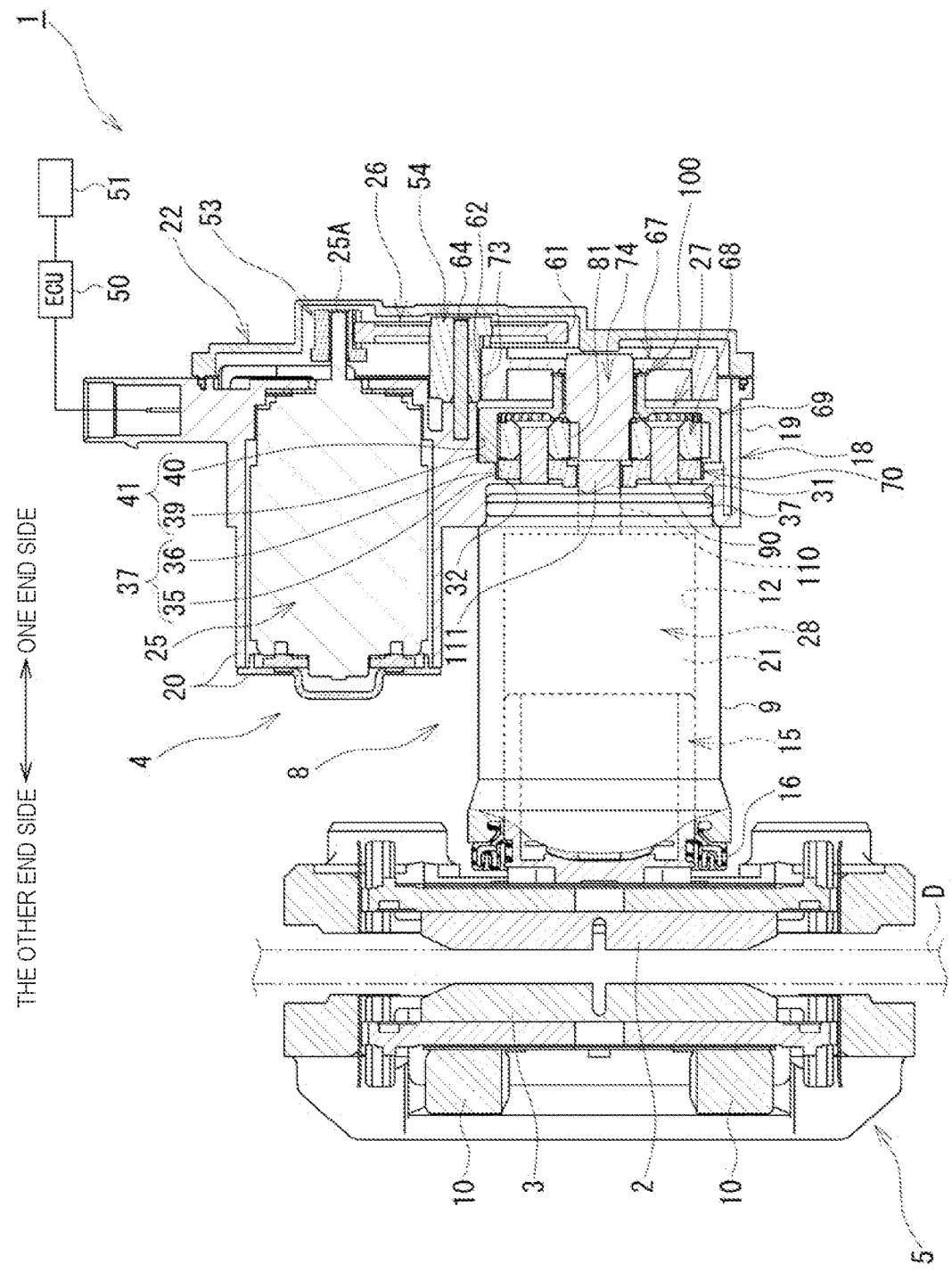
FIG. 1 is a cross-sectional view illustrating a disk brake according to an embodiment of the present invention.

As illustrated in FIG. 1, a disk brake 1 according to the present embodiment includes a pair of inner and outer brake pads 2 and 3 and a caliper 4. The pair of inner and outer brake pads 2 and 3 is disposed on both the axial sides while sandwiching a disk rotor D mounted at a rotational portion of the vehicle. The present disk brake 1 is configured as a floating caliper-type disk brake. The pair of inner and out brake pads 2 and 3, and the caliper 4 are supported movably in the axial direction of the disk rotor D on a bracket 5 fixed to a non-rotational portion such as a knuckle of the vehicle.

As illustrated in FIG. 1, a caliper main body 8, which is the main body of the caliper 4, includes a cylindrical cylinder portion 9 and a pair of claw portions 10 and 10. The cylinder portion 9 is disposed on the proximal end side facing the inner brake pad 2, and is opened toward this inner brake pad 2. The pair of claw portions 10 and 10 extends from the cylinder portion 9 to the outer side across over the disk rotor D, and faces the outer brake pad 3 and is disposed on the distal end side. A piston 15 is contained non-rotatably and axially movably relative to the cylinder portion 9 inside the cylinder portion 9 of the caliper main body 8, i.e., in a cylinder bore 12 of the cylinder portion 9. The piston 15 functions to press the inner brake pad 2, and is formed into a bottomed cupped shape. This piston 15 is contained in the cylinder bore 12 of the cylinder portion 9 in such a manner that the bottom portion thereof faces the inner brake pad 2. The piston 15 is supported non-rotatably relative to the cylinder bore 12 and thus the caliper main body 8 with the aid of rotation prohibition engagement between the bottom portion of the piston 15 and the inner brake pad 2.

A seal member (not illustrated) is disposed in the cylinder bore 12 of the cylinder portion 9 on the inner peripheral surface thereof on the other end side. The piston 15 is contained in the cylinder bore 12 axially movably in a state in contact with this seal member, A hydraulic pressure chamber 21 is formed between the piston 15 and the bottom surface of the cylinder portion 9. The hydraulic pressure chamber 21 is defined by the seal member. A hydraulic pressure is supplied from a hydraulic pressure source (not illustrated), such as a master cylinder and a hydraulic pressure control unit, into this hydraulic pressure chamber 21 via a hydraulic pressure circuit (not illustrated) provided at the cylinder portion 9. A dust boot 16 is interposed between the outer peripheral surface of the piston 15 on the bottom portion side thereof and the inner peripheral surface of the cylinder bore 12 on the other end side thereof. The disk brake 1 is configured to prevent an entry of a foreign object into the cylinder bore 12 of the cylinder portion 9 with the aid of these seal member and dust boot 16.

A housing 18 is attached to the bottom portion of the cylinder portion 9 of the caliper main body 8. An opening of the housing 18 on one end thereof is air-tightly closed by a cover member 22, A seal member 37 is disposed between a fitting recessed portion 31 of the housing 8 and the cylinder portion 9. Air-tightness is maintained in the housing 18 with the aid of this seal member 37. Also referring to FIGS. 2 and 3, the housing 18 includes a first housing portion 19 and a second housing portion 20 so as to cover the outer periphery of the bottom portion of the cylinder portion 9. The first housing portion 19 contains a part of a multi-stage spur speed reduction mechanism 26 and a planetary gear speed reduction mechanism 27, which will be described below. The second housing portion 20 is provided in a protruding manner so as to have a bottomed cylindrical shape on the other end side integrally from the first housing portion 19, and contains a motor 25, which will be described below. As seen from FIG. 1, the cylinder portion 9 of the caliper main body 8 and the electric motor 25 are arranged so as to be lined up.

Figure 2:
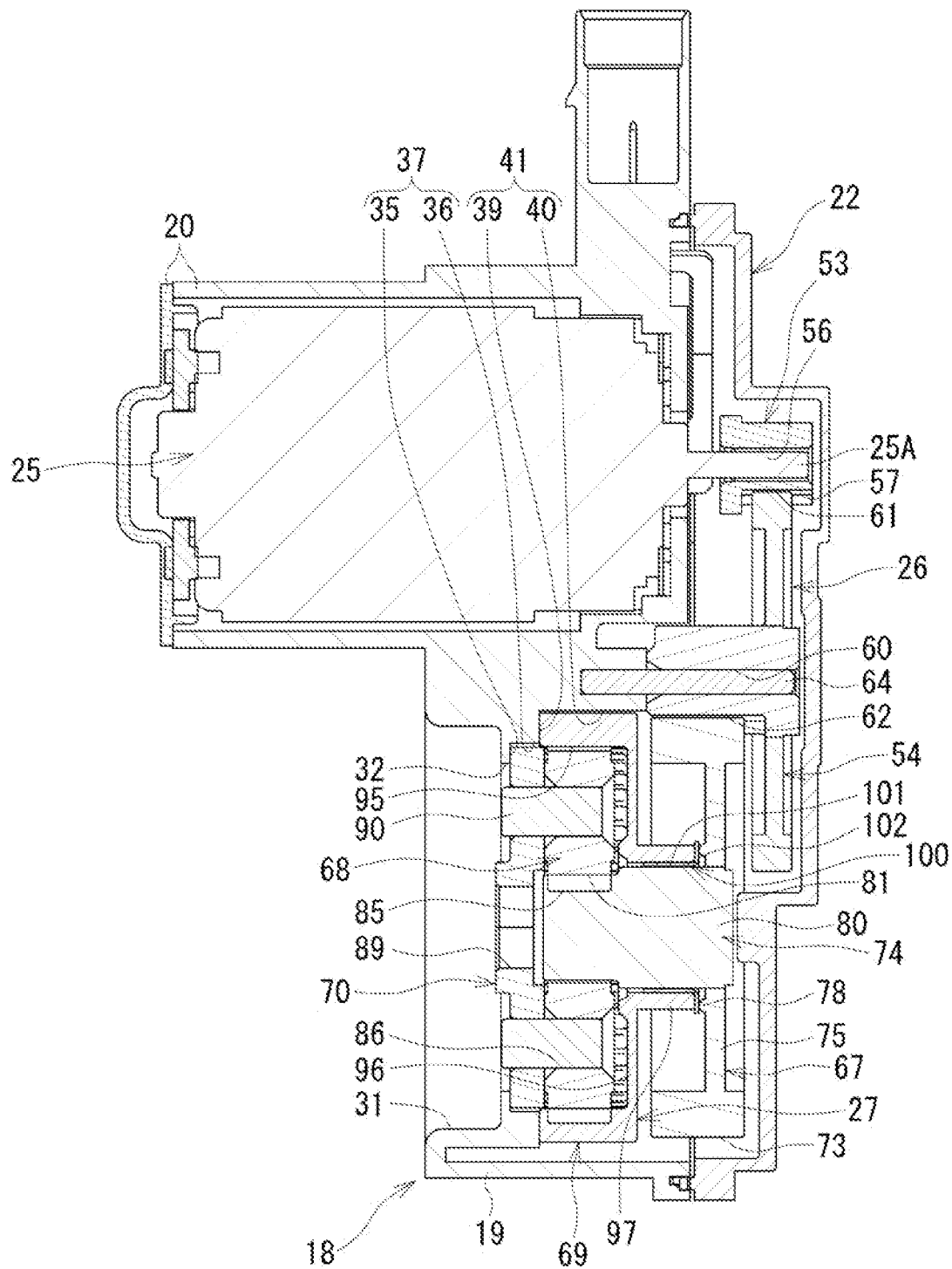
FIG. 2 is an enlarged cross-sectional view of main portions of the disk brake in FIG. 1.
Figure 3:
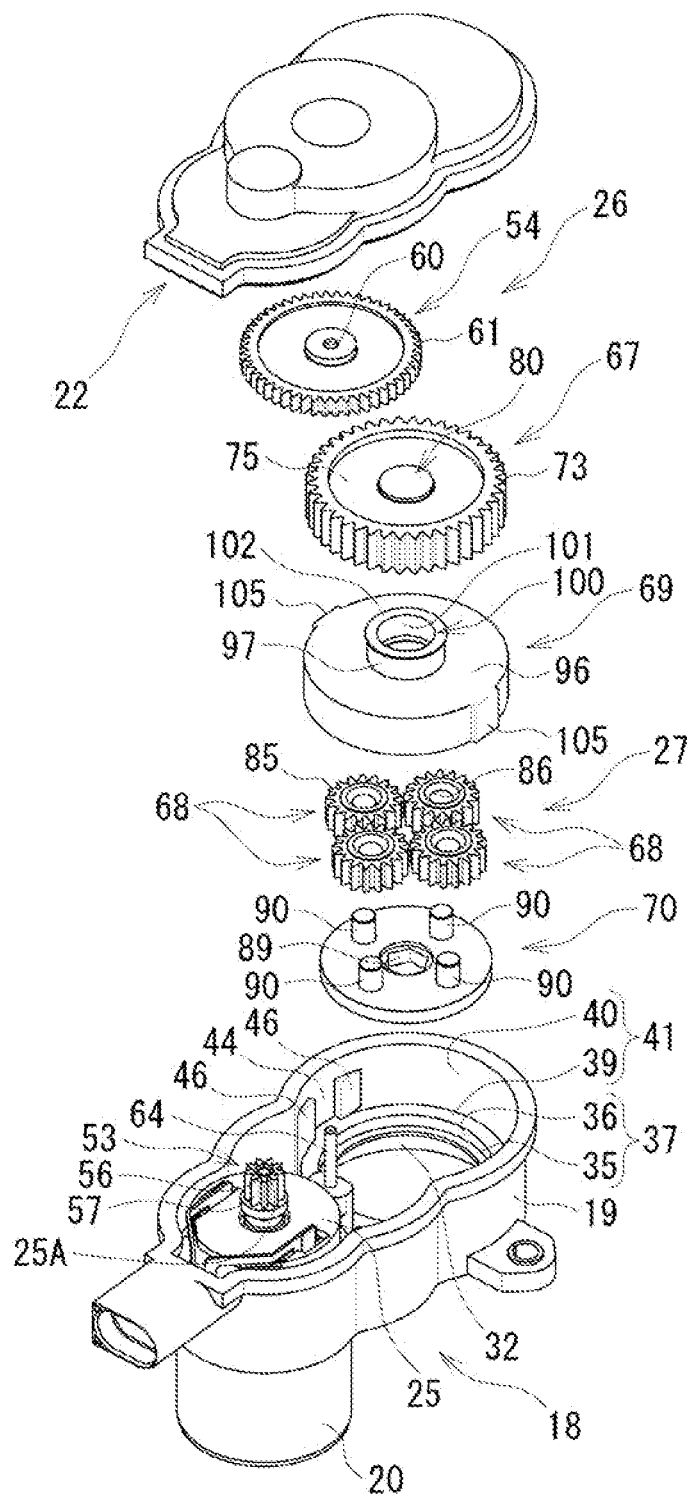
FIG. 3 is an exploded perspective view of main portions of the disk brake in FIG. 1.

As illustrated in FIGS. 2 and 3, the first housing portion 19 is formed into a generally cylindrical shape opened on the one end side and including an opening portion 32 on the other end side. As described above, a part of the multi-stage spur speed reduction mechanism 26 and the planetary gear speed reduction mechanism 27 are disposed inside the first housing portion 19. The fitting recessed portion 31 is formed on the other end side of the first housing portion 19. The bottom portion of the cylinder portion 9 is fitted to this fitting recessed portion 31 air-tightly with the aid of the seal member 37. The opening portion 32 is formed at the bottom portion of the fitting recessed portion 31. A first stepped portion 37 is formed on the one end side with respect to this opening portion 32. The first stepped portion 37 includes a first annular surface 35 and a first peripheral wall surface 36. A carrier 70 of the planetary gear speed reduction mechanism 27, which will be described below, is rotatably supported on this first stepped portion 37. A second stepped portion 41 is formed on the one end side with respect to this first stepped portion 37. The second stepped portion 41 includes a second annular surface 39 and a second peripheral wall surface 40. An internal gear 69 of the planetary gear speed reduction mechanism 27, which will be described below, is supported on this second stepped portion 41 with a relative rotation thereof prohibited and a radial movement thereof restricted. Referring to FIG. 3, the second peripheral wall surface 40 of the second stepped portion 41 is formed into such a C-like shape in a planar view that a circumferential part thereof on the electric motor 25 side is cut out.

Figure 4:
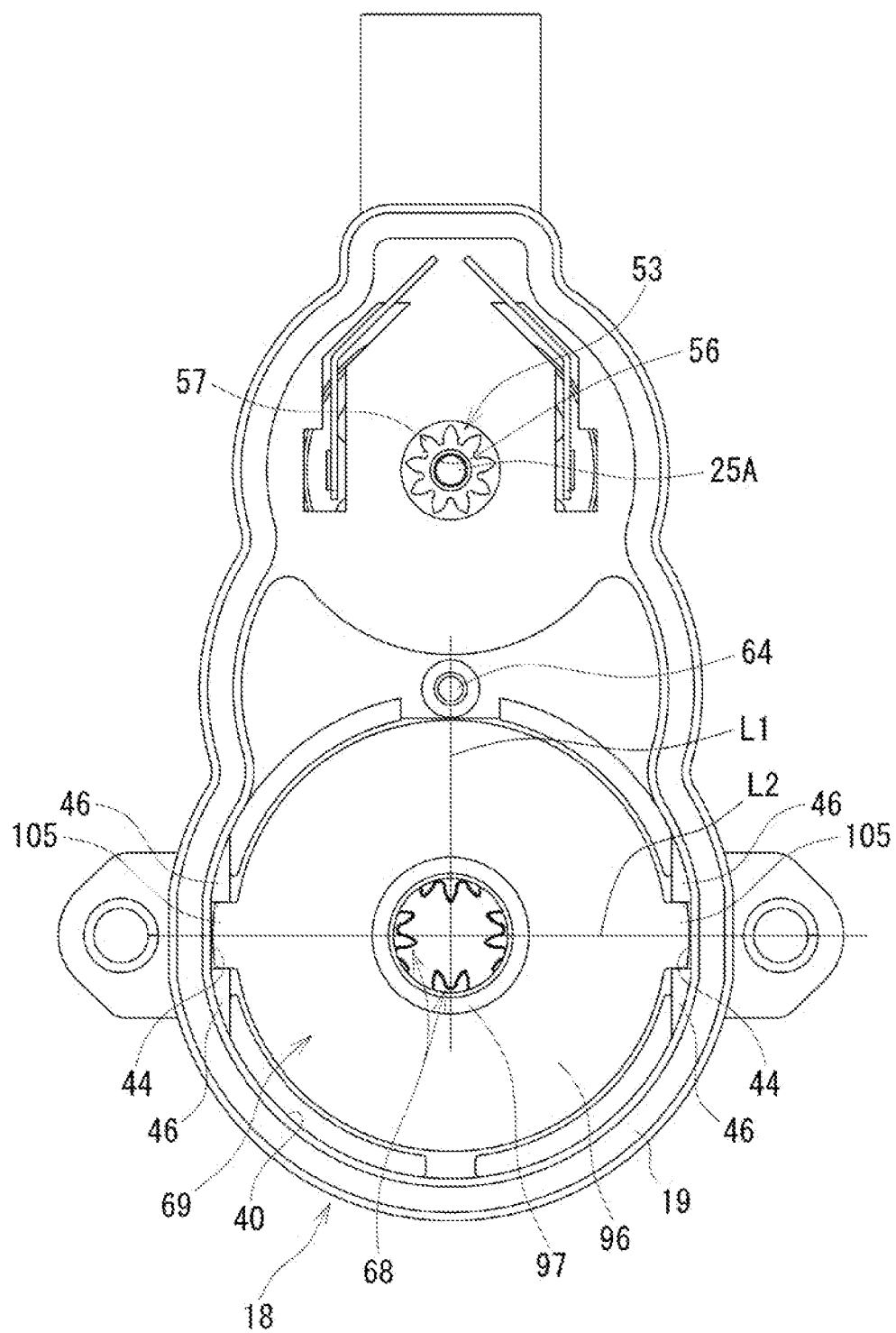
FIG. 4 is a plan view illustrating the inside of a housing of the disk brake in FIG. 1 as viewed from a cover member side where an internal gear can be visually confirmed.

Also referring to FIG. 4, engagement recessed portions 44 and 44 are formed on opposite positions on the second peripheral wall surface 40 of the second stepped portion 41, respectively. More specifically, these engagement recessed portions 44 and 44 are formed at a pitch of 180° along the circumferential direction on the second peripheral wall surface 40, The engagement recessed portions 44 are constructed by forming protrusion portions 46 and 46 at two positions at an interval along the circumferential direction on the inner wall surface of the first housing portion 19. Each of the engagement recessed portions 44 and 44 is formed in such a manner that their respective positions along the circumferential direction coincide with positions along a straight line L2 extending in a direction perpendicular to a straight line L1, which connects the radial center of a first speed reduction gear 54 (a second gear) (the radial center of a shaft 64 in FIG. 4) and the radial center of a second speed reduction gear 67 (a first gear) (the radial center of a sun gear 81 of the planetary gear speed reduction mechanism 27 (the second speed reduction gear 67) and the radial center of the internal gear 69 in FIG. 4). The first speed reduction gear 54 and the second speed reduction gear 67 will be described below. Each of the engagement recessed portions 44 and 44 correspond to a rotation restriction portion. The housing 18 corresponds to a support member.

As illustrated in FIG. 1, the caliper main body 8 includes the electric motor 25, the multi-stage spur speed reduction mechanism 26 and the planetary gear speed reduction mechanism 27, and a piston thrust mechanism 28. The multi-stage spur speed reduction mechanism 26 and the planetary gear speed reduction mechanism 27 power up a rotational torque from the electric motor 25. The piston thrust mechanism 28 converts a rotational motion from these multi-stage spur speed reduction mechanism 26 and the planetary gear speed reduction mechanism 27 into a linear motion to apply a thrust force to the piston 15, and also holds the thrust piston 15 at a braking position. An electronic control unit (ECU) 50 is connected to the electric motor 25. The electronic control unit 50 functions to control the rotation of the electric motor 25. A parking switch 51 is connected to the electronic control unit 50, The parking switch 51 is operated when the parking brake is switched on/off. The electronic control unit 50 can also actuate the parking brake based on a signal from the vehicle side independently of the operation on the parking switch 51. The electric motor 25 is contained in the second housing portion 20 of the housing 18 as described above. Further, a part of the multi-stage spur speed reduction mechanism 26 and the planetary gear speed reduction mechanism 27 are contained in the first housing portion 19 of the housing 18.

As illustrated in FIGS. 2 and 3, the multi-stage spur speed reduction mechanism 26 includes a pinion gear 53 and the first speed reduction gear 54 as the second gear. The pinion gear 53 is cylindrically formed, and includes a hole portion 56 and a gear 57. A rotational shaft 25A of the electric motor 25 is fixedly press-fitted in the hole portion 56. The gear 57 is formed on the outer periphery. A shaft hole 60 is formed at the first speed reduction gear 54. The shaft hole 60 axially extends through the radial center of the first speed reduction gear 54. A large gear 61 and a small gear 62 are integrally formed on this first speed reduction gear 54. The large gear 61 is meshed with the gear 57 of the pinion gear 53, and is large in diameter. The small gear 62 extends from the large gear 61 concentrically and axially, and is small in diameter. The small gear 62 integrally extends from the large gear 61 toward the other end side. The shaft 64 is rotatably supported in the shaft hole 60 of the first speed reduction gear 54. The other end of this shaft 64 is integrally fixed to the wall portion between the first housing portion 19 and the second housing portion 20 of the housing 18. The small gear 62 of the first speed reduction gear 54 is meshed with the planetary gear speed reduction mechanism 27.

The planetary gear speed reduction mechanism 27 includes the second speed reduction gear 67 including the sun gear 81, which serves as the first gear, a plurality of planetary gears 68 (four gears in the present embodiment), the internal gear 69, and the carrier 70. The second speed reduction gear 67 including the sun gear 81, the internal gear 69, and the carrier 70 are disposed concentrically with one another. The second speed reduction gear 67 includes a large gear 73 and a small-diameter shaft gear 74. The large gear 73 is meshed with the small gear 62 of the first speed reduction gear 54, and is large in diameter. The small-diameter shaft gear 74 extends along the axial direction from the large gear 73 coaxially, and is small in diameter. The large gear 73 integrally includes a radially inwardly extending annular wall portion 75 closer to one end thereof. An annular protrusion portion 78 is formed on the other end surface of this annular wall portion 75 and closer to the radial center thereof. The annular protrusion portion 78 is provided in a manner annularly protruding toward the other end side. The small-diameter shaft gear 74 integrally extends from the radially inner end portion of the annular wall portion 75 of the large gear 73 toward the other end side concentrically. The small-diameter shaft gear 74 includes a large-diameter shaft portion 80 and the sun gear 81. The large-diameter shaft portion 80 is located on the one end side. The sun gear 81 extends continuously from this large-diameter shaft portion 80 toward the other end side concentrically. The large-diameter shaft portion 80 is larger in diameter than the sun gear 81.

Each of the planetary gears 68 includes a gear 85 and a pin hole portion 86. The gear 85 is meshed with the sun gear 81 of the second speed reduction gear 67. A pin 90 erected from the carrier 70 is rotatably inserted through the pin hole portion 86. Each of the planetary gears 68 is laid out at an even interval on the circumference of the carrier 70, which will be described below. The carrier 70 is formed into a disk shape. The carrier 70 is rotatably supported on the first annular surface 35 of the first stepped portion 37 of the first housing portion 19. A polygonal hole 89 is formed generally at the radial center of the carrier 70 by extending therethrough. The outer diameter of this carrier 70 is approximately equal to the outer diameter of the revolution locus of each of the planetary gears 68. Each of the plurality of pins 90 is provided on the outer peripheral side of the carrier 70 in a manner protruding toward the one end side. Each of the pins 90 is formed at an internal along the circumferential direction. These pins 90 are rotatably inserted through the respective pin hole portions 86 of the planetary gears 68, respectively. Due to this configuration, the revolution motion of each of the planetary gears 68 is transmitted to the carrier 70. As illustrated in FIG. 1, a polygonal shaft portion 111 of a spindle 110 of the piston thrust mechanism 28 (a rotation-linear motion conversion mechanism), which will be described below, is fitted in the polygonal hole 89 of the carrier 70. This allows a rotational torque to be mutually transmitted between the carrier 70 and the spindle 110.

Refuting to FIGS. 2 and 3, the internal gear 69 includes inner teeth 95, an annular wall portion 96, and a cylindrical protrusion portion 97. The respective gears 85 of the planetary gears 68 are meshed with the inner teeth 95, respectively. The annular wall portion 96 concentrically extends continuously from one ends of these inner teeth 95 radially inwardly. The cylindrical protrusion portion 97 concentrically extends continuously from the radial inner end portion of this annular wall portion 96 toward the one end side. The cylindrical protrusion portion 97 is disposed concentrically on the radially outer side of the large-diameter shaft portion 80 provided on the small-diameter shaft gear 74 of the second speed reduction gear 67. A sliding bearing 100 is disposed between this cylindrical protrusion portion 97 and the large-diameter shaft portion 80 of the second speed reduction gear 67. This sliding bearing 100 includes a cylindrical bearing portion 101 and an annular flange portion 102. The annular flange portion 102 extends from one end of this hearing portion 101 radially outwardly. This bearing portion 101 is disposed between the cylindrical protrusion portion 97 of the internal gear 69 and the large-diameter shaft portion 80 of the second speed reduction gear 67.

The annular flange portion 102 of the sliding hearing 100 is sandwiched between one end surface of the cylindrical protrusion portion 97 of the internal gear 69 and the annular protrusion portion 78 provided on the other end surface of the annular wall portion 75 of the second speed reduction gear 67 (the large gear 73). With the aid of this sliding bearing 100, the large-diameter shaft portion 80 of the second speed reduction gear 67 is supported rotatably relative to the cylindrical protrusion portion 97 of the internal gear 69, Thus, the second speed reduction gear 67 is supported rotatably relative to the internal gear 69. This configuration causes the second speed reduction gear 67 to have a rotational axis near the radial center of the internal gear 69.

As illustrated in FIGS. 2 to 4, protrusion portions 105 and 105 provided in a radially outwardly protruding manner are formed on the outer peripheral surface of the inner tooth portion of the internal gear 69 at a pitch of 180° along the circumferential direction. These protrusion portions 105 are each formed into a generally cuboidal shape. These protrusion portions 105 are provided in a protruding manner over the entire axial range on the outer peripheral surface of the inner tooth portion of the internal gear 69. Then, a fit dimensional tolerance between the width length of the protrusion portion 105 of the internal gear 69 and the width length of the engagement recessed portion 44 of the first housing portion 19 (the distance between the individual protrusion portions 46 and 46) is set and a fit dimensional tolerance between the distance between the respective distal ends of the protrusion portions 105 and 105 of the internal gear 69 and the distance between the respective bottom surfaces of the recessed portions 44 and 44 of the first housing portion 19 is also set in such a manner that the protrusion portions 105 of the internal gear 69 are engaged with the engagement recessed portions 44 of the first housing portion 19 and abut against the respective protrusion portions 46 and 46 forming the engagement recessed portions 44 and the bottom surfaces of the engagement recessed portions 44 (the second peripheral wall surface 40).

Then, the internal gear 69 is supported in such a manner that axial and radial movements thereof relative to the first housing portion 19 are restricted and a rotation thereof relative to the first housing portion 19 is prohibited by bringing the other end surface of the internal gear 69 into abutment with the second annular surface 39 of the second stepped portion 41 of the first housing portion 19 and also engaging the protrusion portions 105 and 105 of the internal gear 69 with the engagement recessed portions 44 and 44 of the first housing portion 19 of the housing 18, respectively. Further, as seen from FIG. 4, the portions at which the protrusion portions 105 and 105 of the internal gear 69 and the engagement recessed portions 44 and 44 of the first housing portion 19 of the housing 18 are engaged with each other, respectively, are located at positions along the straight line L2 extending in the direction perpendicular to the straight line L1, which connects the radial center of the first speed reduction gear 54 (the second gear) (the radial center of the shaft 64 in FIG. 4) and the radial center of the second speed reduction gear 67 (the first gear) (the radial center of the sun gear 81 of the planetary gear speed reduction mechanism 27 (the second speed reduction gear 67) and the radial center of the internal gear 69 in FIG. 4). Each of the protrusion portions 105 corresponds to a rotation restriction portion.

The internal gear 69 also restricts the position of the second speed reduction gear 67 relative to the housing 18 by rotatably supporting the second speed reduction gear 67. The distance between the central axes in the meshing between the large gear 73 of the second speed reduction gear 67 and the small gear 62 of the first speed reduction gear 54 is determined based on the positions of the housing 18, and the shaft 64 and the internal gear 69 fixed to the housing 18 in addition to the large gear 73 and the small gear 62 meshed with each other, and therefore is susceptible to a variation in the position of the internal gear 69 relative to the housing 18.

Then, a variation in the distance between the centers that connects the radial center of the large gear 73 of the second speed reduction gear 67 and the radial center of the small gear 62 of the first speed reduction gear 54 directly leads to a variation in the distance between the central axes in the meshing between the large gear 73 of the second speed reduction gear 67 and the small gear 62 of the first speed reduction gear 54, but a variation in the distance in the direction (the direction of the straight line L2) perpendicular to the straight line L1, which connects the radial center of the first speed reduction gear 54 and the radial center of the second speed reduction gear 67, i.e., a variation in the distance between the distance between the respective distal ends of the protrusion portions 105 and 105 of the internal gear 69 and the distance between the respective bottom surfaces of the engagement recessed portions 44 and 44 of the first housing portion 19 does not largely affect the distance between the central axes in the meshing between the large gear 73 of the second speed reduction gear 67 and the small gear 62 of the first speed reduction gear 54, For this reason, the fit dimensional tolerance along the radial direction (the fit dimensional tolerance between the distance between the respective distal ends of the protrusion portions 105 and 105 and the distance between the respective bottom surfaces of the engagement recessed portions 44 and 44) can be set to a relatively large value with respect to each of the protrusion portions 105 and 105 of the internal gear 69 and each of the engagement recessed portions 44 and 44 provided on the first housing portion 19 of the housing 18.

Further, as illustrated in FIG. 1, the piston thrust mechanism 28 is formed by the rotation-linear motion conversion mechanism. The piston thrust mechanism 28 functions to convert the rotational motion from the multi-stage spur speed reduction mechanism 26 and the planetary gear speed reduction mechanism 27, i.e., the rotational motion from the spindle 110 into a linear motion to apply a thrust force to the piston 15 with use of a movement of a linear motion member (not illustrated)) derived therefrom to thus thrust forward the piston 15 (move the piston 15 toward the other end side), and also hold this piston 15 at the braking position. The piston thrust mechanism 28 is disposed in the cylinder bore 12 between the bottom surface thereof and the piston 15. Then, when the spindle 110 rotates according to the rotation of the carrier 70, the function of the piston thrust mechanism 28 causes the linear motion member thereof to move forward toward the other end side, thereby being able to cause this piston 15 to move forward to press the inner brake pad 2 against the disk rotor D by this piston 15 and maintain this braking state.

Next, functions of the disk brake 1 according to the present embodiment will be described.

First, a function when the disk brake 1 brakes the vehicle as a normal hydraulic brake according to an operation performed on a brake pedal (not illustrated) will be described.

When the brake pedal is pressed by a driver, a hydraulic pressure according to a force pressing the brake pedal is supplied from the hydraulic pressure source such as the master cylinder into the hydraulic pressure chamber 21 in the cylinder portion 9 (the cylinder bore 12) of the caliper main body 8 via the hydraulic pressure circuit (both the hydraulic pressure source and the hydraulic pressure circuit are omitted in the drawings). As a result, the piston 15 advances (moves leftward in FIG. 1) from an original position, at which the piston 15 is located when the vehicle is not braked, while elastically deforming the piston seal, and presses the inner friction pad 2 against the disk rotor D. Then, due to a reaction force to the pressing force from the piston 15 to the inner brake pad 2, the caliper main body 8 moves to the inner side (rightward in FIG. 1) with respect to the bracket 5, thereby pressing the outer brake pad 3 against the disk rotor D with use of each of the claw portions 10 and 10. As a result thereof, the disk rotor D is sandwiched between the pair of inner and outer brake pads 2 and 3 and a frictional force is generated thereby, and this eventually leads to generation of a braking force on the vehicle.

Then, when the driver releases the brake pedal, the supply of the hydraulic pressure from the hydraulic pressure source such as the master cylinder is stopped, and the hydraulic pressure in the hydraulic pressure chamber 21 reduces. As a result, the piston 15 moves backward to the original position due to a resilience force of the piston seal from the elastic deformation, and the braking force is released. When the movement amount of the piston 15 increases according to wear of the inner and outer brake pads 2 and 3 to then exceed the limit on the elastic deformation of the piston seal, a slip occurs between the piston 15 and the piston seal. The disk brake 1 is configured in such a manner that this slip causes a shift of the original position of the piston 15 relative to the caliper main body 8, and a pad clearance is adjusted to a constant value thereby.

Next, a function as the parking brake, which is one example of the function for maintaining the stopped state of the vehicle, will be described. First, when the parking brake is actuated (applied) by operating the parking switch 51 from a state that the parking brake is released, the motor 25 is driven in an application direction according to an instruction from the electronic control unit 50 and the sun gear 81 of the planetary gear speed reduction mechanism 27 is rotated via the multi-stage spur speed reduction mechanism 26. This rotation of the sun gear 81 causes each of the planetary gears 68 to revolve about the axis center of the sun gear 81 while rotating about its own axis center, thereby causing the carrier 70 to rotate. Then, the rotation from the carrier 70 is transmitted to the spindle 110.

Subsequently, when the spindle 110 rotates, the function of the rotation-linear motion conversion mechanism 28 causes the linear motion member thereof to move forward, thereby causing the piston 15 to move forward. Due to the forward movement of this piston 15, the inner brake pad 2 is pressed against the disk rotor D. Then, due to a reaction force to the pressing force from the piston 15 to the inner brake pad 2, the caliper main body S moves to the inner side (rightward in FIG. 1) with respect to the bracket 5, thereby pressing the outer brake pad 3 against the disk rotor D with use of each of the claw portions 10 and 10, As a result thereof, the disk rotor D is sandwiched between the pair of inner and outer brake pads 2 and 3 and a frictional force is generated thereby, and thus a braking force is generated on the vehicle and this braking state can be maintained. The electronic control unit 50 drives the electric motor 25 until the pressing force from the pair of inner and outer brake pads 2 and 3 to the disk rotor D reaches a predetermined value, such as until the current value of the electric motor 25 reaches a predetermined value. After that, the electronic control unit 50 stops the power supply to the electric motor 25 upon detecting that the pressing force applied to the disk rotor D reaches the predetermined value according to the fact that the current value of the electric motor 25 reaches the predetermined value.

On the other hand, when the braking is released, the rotational shaft 25A of the electric motor 25 rotates in the opposite direction, i.e., a release direction according to an instruction from the electronic control unit 50, and this rotation in the opposite direction is also transmitted to the spindle 110 via the multi-stage spur speed reduction mechanism 26 and the planetary gear speed reduction mechanism 27. As a result, the function of the piston thrust mechanism 28 causes the linear motion member thereof to move backward to return to the initial state according to the rotation of the spindle 110 in the opposite direction, thereby causing a release of the braking force applied to the disk rotor by the pair of inner and outer brake pads 2 and 3.

In the above-described manner, the disk brake 1 according to the present embodiment employs such a configuration that the portions at which the protrusion portions 105 and 105 of the internal gear 69 and the engagement recessed portions 44 and 44 of the first housing portion 19 of the housing 18 engaged with each other, respectively, are positioned so as to be arranged along the straight line L2 extending in the direction perpendicular to the straight line L1, which connects the radial center of the first speed reduction gear 54 and the radial center of the second speed reduction gear 67. Due to this configuration, when aiming to improve the precision of the position of the internal gear 69, more specifically, reduce the variation in the distance between the centers that connects the radial center of the large gear 73 of the second speed reduction gear 67 and the radial center of the small gear 62 of the first speed reduction gear 54 (the variation in the distance between the central axes in the meshing between the large gear 73 of the second speed reduction gear 67 and the small gear 62 of the first speed reduction gear 54), the fit dimensional tolerance along the radial direction (the fit dimensional tolerance between the distance between the respective distal ends of the protrusion portions 105 and 105 and the distance between the respective bottom surfaces of the engagement recessed portions 44 and 44) can be set to a relatively large value, and the aimed improvement can be achieved by setting only the fit dimensional tolerance along the circumferential direction (the fit dimensional tolerance between the width length of the protrusion portion 105 and the width length of the engagement recessed portion 44) to a small value, with respect to each of the protrusion portions 105 and 105 of the internal gear 69 and each of the engagement recessed portions 44 and 44 provided on the first housing portion 19 of the housing 18. Therefore, the cost increase can be prevented or impeded.

Further, the disk brake 1 according to the present embodiment includes two portions as the portions at which the protrusion portions 105 and 105 of the internal gear 69 and the engagement recessed portions 44 and 44 of the first housing portion 19 of the housing 18 are engaged with each other, respectively, thereby having a smaller number of portions required to be dimensionally managed compared to the conventional technique and thus leading to a further cost reduction.

Further, the disk brake 1 according to the present embodiment can further improve the precision of the position of the internal gear 69 because each of the protrusion portions 105 and 105 of the internal gear 69 and each of the engagement recessed portions 44 and 44 of the first housing portion 19 of the housing 18 also have the function of restricting the radial movement of the internal gear 69 relative to the housing 18.

The disk brake 1 according to the present embodiment is configured in such a manner that the rotation restriction portion provided between the internal gear 69 and the second peripheral wall surface 40 of the first housing portion 19 is formed by each of the protrusion portions 105 and 105 provided on the outer peripheral surface of the internal gear 69 and each of the engagement recessed portions 44 and 44 provided on the second peripheral wall portion 40 of the first housing portion 19, but may be configured in such a manner that each of the engagement recessed portions 44 and 44 is provided on the outer peripheral surface side of the internal gear 69 and each of the protrusion portions 105 and 105 is provided on the second peripheral wall surface 40 side of the first housing portion 19.

Further, the present embodiment for prohibiting the relative rotation that is provided between the internal gear 69 and the first housing portion 19 is employed for the disk brake 1 that generates the braking force by driving the electric motor 25 when actuating the parking disk brake used at the time of parking brake or the like in the above description, but the present embodiment may be employed for an electric disk brake that generates the braking force by driving the electric motor 25 at the time of normal braking.

Possible configurations as the above-described disk brake 1 according to the present embodiment include the following examples.

According to a first configuration, a disk brake includes a piston (15) configured to press one (2) of a pair of pads (2 and 3) against a rotor (D) with the pair of pads (2 and 3) disposed on both axial sides of the rotor (D) while sandwiching this rotor (D), a caliper main body (8) including a cylinder portion (9) in which this piston (15) is movably contained and a piston thrust mechanism (28) configured to thrust this piston (15) is also contained, a motor (25) mounted on this caliper main body (8), a speed reduction mechanism (26 and 27) configured to power up a rotational force from this motor (25) and transmit it to the piston thrust mechanism (28), and a support member (18) on which this speed reduction mechanism (26 and 27) is supported. The speed reduction mechanism (26 and 27) includes a planetary gear speed reduction mechanism (27) including an internal gear (69) relatively non-rotatably supported on the support member (18), a first gear (67) having a rotational axis near a radial center of the internal gear (69), and a second gear (54) located adjacent to this first gear (67) and configured to transmit the rotation from the motor (25) to the first gear (67). A rotation restriction portion (44 and 105) configured to restrict a relative rotation is provided between the internal gear (69) and the support member (18). This rotation restriction portion (44 and 105) is disposed along a direction perpendicular to a straight line connecting a radial center of the first gear (67) and a radial center of the second gear (54).

According to a second configuration, in the first configuration, the rotation restriction portion (44 and 105) includes rotation restriction portions disposed at two portions.

According to a third configuration, in the first or second configuration, the rotation restriction portion (44 and 105) also has a function of restricting movement of the internal gear (69) relative to the support member (18).

REFERENCE SIGNS LIST

1 disk brake
2 inner brake pad
3 outer brake pad
8 caliper main body
9 cylinder portion
15 piston
18 housing (support member)
19 first housing portion
25 electric motor (motor)
26 multi-stage spur speed reduction mechanism
27 planetary gear speed reduction mechanism
28 piston thrust mechanism
44 engagement recessed portion (rotation restriction portion)
54 first speed reduction gear (second gear)
67 second speed reduction gear (first gear)
69 internal gear
105 protrusion portion (rotation restriction portion)
D disk rotor (rotor)

The invention claimed is:

1. A disk brake comprising:
a piston configured to press one of a pair of pads against a rotor, the pair of pads being disposed on both axial sides of the rotor while sandwiching the rotor;
a caliper main body including a cylinder portion in which the piston is movably contained and a piston thrust mechanism configured to thrust the piston is also contained;
a motor mounted on the caliper main body;
a speed reduction mechanism configured to power up a rotational force from the motor and transmit it to the piston thrust mechanism; and
a support member on which the speed reduction mechanism is supported,
wherein the speed reduction mechanism includes
a planetary gear speed reduction mechanism including an internal gear relatively non-rotatably supported on the support member,
a first gear having a rotational axis near a radial center of the internal gear, and
a second gear located adjacent to the first gear and configured to transmit the rotation from the motor to the first gear,
wherein a rotation restriction portion configured to restrict a relative rotation is provided between the internal gear and the support member, and
wherein the rotation restriction portion is disposed along a direction perpendicular to a straight line connecting a radial center of the first gear and a radial center of the second gear.

2. The disk brake according to claim 1, wherein the rotation restriction portion includes two rotation restriction sections.

3. The disk brake according to claim 1, wherein the rotation restriction portion also has a function of restricting a radial movement of the internal gear relative to the support member.

4. The disk brake according to claim 2, wherein the rotation restriction portion also has a function of restricting a radial movement of the internal gear relative to the support member.

* * * * *